United States Patent [19]

Hutton

[11] Patent Number: 6,000,427
[45] Date of Patent: Dec. 14, 1999

[54] MANIFOLD FOR USE WITH DUAL PRESSURE SENSOR UNITS

[76] Inventor: Peter B. Hutton, 2406 26 A Street S.W., Calgary, Alberta, Canada, T32C1

[21] Appl. No.: 09/174,746

[22] Filed: Oct. 19, 1998

[51] Int. Cl.$^6$ ..................................................... F16K 11/22
[52] U.S. Cl. ............................................. 137/597; 73/756
[58] Field of Search ............................................. 137/597

[56] References Cited

U.S. PATENT DOCUMENTS

| | | |
|---|---|---|
| Re. 34,610 | 5/1994 | Miller et al. . |
| D. 287,827 | 1/1987 | Broden . |
| D. 297,315 | 8/1988 | Pierce et al. . |
| D. 317,266 | 6/1991 | Broden et al. . |
| D. 318,432 | 7/1991 | Broden et al. . |
| 3,564,923 | 2/1971 | Nudd, Jr. et al. . |
| 3,596,680 | 8/1971 | Adams . |
| 3,618,390 | 11/1971 | Frick . |
| 3,653,405 | 4/1972 | Nelson . |
| 3,747,637 | 7/1973 | Mollere . |
| 3,765,441 | 10/1973 | Chang . |
| 3,768,511 | 10/1973 | Bias . |
| 3,817,283 | 6/1974 | Hewson . |
| 3,934,605 | 1/1976 | Legris . |
| 4,182,362 | 1/1980 | Hewson et al. . |
| 4,193,420 | 3/1980 | Hewson . |
| 4,215,721 | 8/1980 | Hetherington et al. . |
| 4,231,261 | 11/1980 | Elmer . |
| 4,281,683 | 8/1981 | Hetherington et al. . |
| 4,319,492 | 3/1982 | Hewson et al. . |
| 4,466,290 | 8/1984 | Frick . |
| 4,494,568 | 1/1985 | Young . |
| 4,602,657 | 7/1986 | Anderson, Jr. et al. . |
| 4,672,728 | 6/1987 | Nimberger . |
| 4,726,399 | 2/1988 | Miller . |
| 4,738,276 | 4/1988 | Adams . |
| 4,745,810 | 5/1988 | Pierce et al. . |

(List continued on next page.)

FOREIGN PATENT DOCUMENTS

| | | |
|---|---|---|
| 1008701 | 4/1977 | Canada . |
| 2086535 | 5/1982 | United Kingdom . |
| 2271164 | 4/1994 | United Kingdom . |
| WO 93/05329 | 3/1993 | WIPO . |
| WO 96/18091 | 6/1996 | WIPO . |

OTHER PUBLICATIONS

Brochure: Manifolds. Century Valve Ltd., Calgary, Alberta, Canada. Admitted prior art.

Flier: DA Minimatic Three Valve Manifold. DA Mfg. Co., Tulia, Texas. Jun. 20, 1978.

Brochure: Instrumentation Manifolds: The World Standard. Bulletin 4190. Parker Fluid Connections. Dec. 1992.

Flier: "Safti–fold" 3 Valve Unimount. Admitted prior art. No date.

*Primary Examiner*—Stephen M. Hepperle
*Attorney, Agent, or Firm*—Browning Bushman

[57] ABSTRACT

A valve manifold for interfacing between a flowline control manifold and first and second pressure sensor units, the manifold having a monolithic body defining a mating surface for mating with the process control manifold and an instrument face for mating with the first and second pressure sensor units, the body having a peripheral wall with a first portion thereof being on the opposite side of the instrument face with respect to the mating face, the first portion of the peripheral wall forming an equalizing valve pocket surface for high and low pressure equalizing valve pockets carrying high and low pressure equalizing valves, respectively. High and low pressure fluid passageways extend from the mating surface to the equalizing valve pockets. The high pressure fluid passageway communicates with a high pressure plenum in the instrument face while the low pressure fluid passageway communicates with a low pressure plenum formed in the instrument face. An equalizing fluid passageway interconnects the high pressure and low pressure equalizing valve pockets. A gauge pressure passageway is connected to the high pressure fluid passageway and is in open communication with a second high pressure plenum formed in the instrument face. A block valve selectively controls flow through the gauge pressure passageway.

15 Claims, 3 Drawing Sheets

U.S. PATENT DOCUMENTS

| | | |
|---|---|---|
| 4,798,089 | 1/1989 | Frick et al. . |
| 4,833,922 | 5/1989 | Frick et al. . |
| 4,865,360 | 9/1989 | Adams . |
| 4,879,912 | 11/1989 | Suckow . |
| 4,921,072 | 5/1990 | Divisi . |
| 4,977,917 | 12/1990 | Adams . |
| 4,993,754 | 2/1991 | Templin, Jr. . |
| 5,036,884 | 8/1991 | Miller, et al. . |
| 5,048,569 | 9/1991 | Stoll et al. . |
| 5,117,867 | 6/1992 | Adams . |
| 5,209,258 | 5/1993 | Sharp et al. . |
| 5,248,167 | 9/1993 | Petrich et al. . |
| 5,272,646 | 12/1993 | Farmer . |
| 5,277,224 | 1/1994 | Hutton et al. . |
| 5,303,733 | 4/1994 | Nelson . |
| 5,341,846 | 8/1994 | Framberg . |
| 5,449,294 | 9/1995 | Rench et al. . |
| 5,494,071 | 2/1996 | Bell et al. . |
| 5,586,570 | 12/1996 | Fukano et al. . |
| 5,720,317 | 2/1998 | Nimberger ............................ 137/597 |

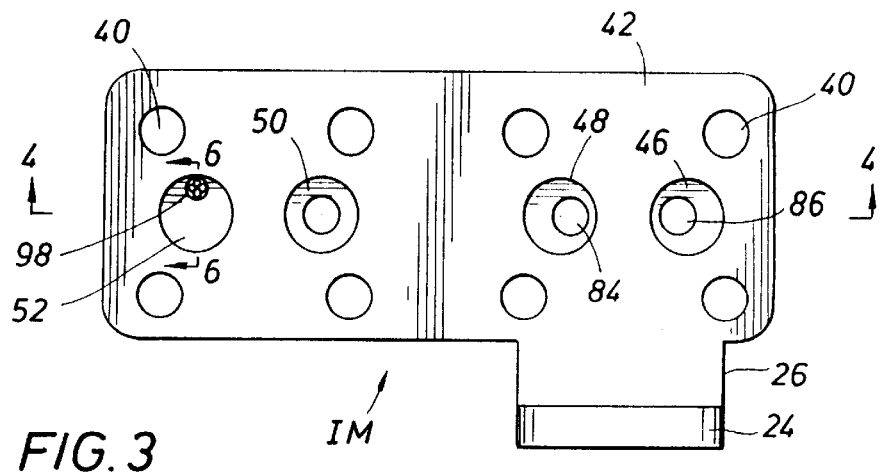
FIG. 3
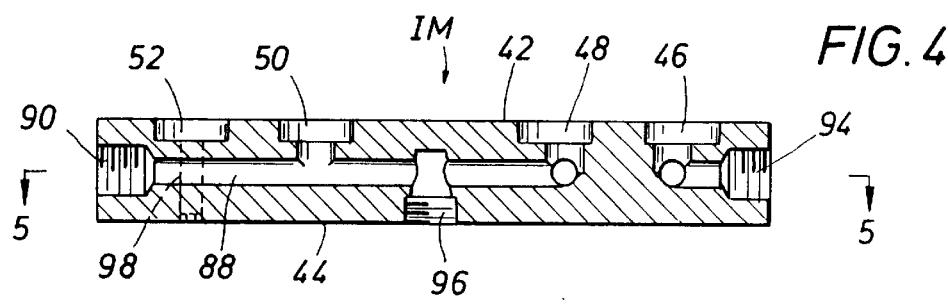
FIG. 4
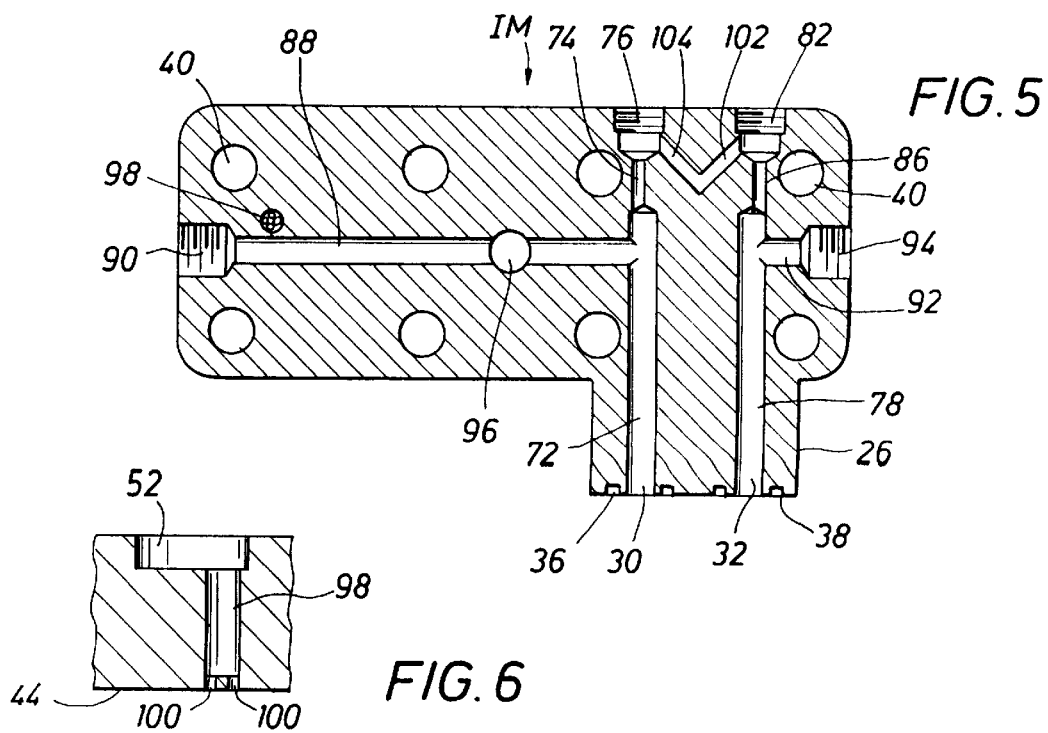
FIG. 5
FIG. 6

MANIFOLD FOR USE WITH DUAL PRESSURE SENSOR UNITS

BACKGROUND OF THE INVENTION

1. Field of the Invention

The present invention relates to a valve manifold for controlling fluid flow between a main flowline and a plurality of pressure sensors/transmitters.

2. Description of the Prior Art

It is frequently necessary to obtain pressure and/or flow characteristics of a fluid in a pipeline or flowline. One common way to accomplish this is by disposing in the flowline a restriction such as an orifice plate, a flow nozzle, or a venturi tube. The high and low pressure values taken from opposed sides of the flow restriction in the flowline are detected by a pressure sensor/transmitter assembly that measures and/or transmits the measured pressures or pressure differential by a suitable mechanical or electrical signal to a remote location, e.g., a control room.

Typically, a valve manifold is mounted between the flowline and the pressure sensor/transmitter, the manifold, in addition to controlling flow to the pressure sensor/transmitter, permitting various functions such as blocking, venting, zero checking, and calibration. A typical manifold includes a plurality of valves, each movable between open and closed positions relative to a flow pathway in the manifold so as to control the flow of fluid through the pathway.

There is an ever increasing desire by the manufacturers of pressure sensors/transmitters to reduce the size, not only of the pressure sensor/transmitter, but also of the package comprised of the manifold that attaches to the flowline and the attached pressure sensor/transmitter. Large, heavy manifold/pressure transmitter packages are more expensive to make, difficult to handle and install, and in many cases simply will not fit appropriately in their intended environment, meaning they have to be installed at another location or in undesirable orientations.

In co-pending application Ser. No. 08/941,951, filed Oct. 1, 1997, and entitled Two-Piece Manifold, there is disclosed a two-piece modular manifold comprised basically of what may be characterized as a process module and an instrument module, the process module being connected to the flowline, the instrument module mating with the pressure sensor/transmitter. The modular manifold disclosed in the latter mentioned patent application is extremely compact and is especially useful for a single, coplanar pressure sensor/transmitter and, more specifically, a differential pressure sensor/transmitter.

It is frequently desired not only to have a differential pressure measurement across the flow restrictor in the pipeline, but also to be able to determine absolute line pressure. For the latter purpose, a gauge pressure transmitter is installed on the pipeline, the gauge pressure transmitter measuring the pressure upstream of the flow restrictor in the flowline. In the distant past, this generally required a separate installation for the differential pressure transmitter and the gauge pressure transmitter. This was clearly undesirable as it increased the likelihood of leakage since it required two separate taps in the flowline installations. Moreover, the requirement of two installations mandated the use of a larger amount of space, often times in environments where space was at a premium. To overcome the problem of two separate installations, various solutions have been proposed. For example, in U.S. Pat. No. 5,036,884, the problem of overcoming dual installations was addressed by means of a valve manifold and an interfacing or transmitting mounting plate providing communication between the valve manifold and the two different transmitters. However, this solution required that the two main block valves that control flow from the high and low pressure outlets from the main flowline, plus any equalizing or venting valves, be carried by the manifold. Furthermore, the assembly shown in U.S. Pat. No. 5,036,884 is bulky and subject to undesirable torsional and bending loads, particularly in flowlines subject to vibrations and/or pulsations from compressors, pumps, and the like in the flowline. To overcome these torsional and bending loads, it is desirable to reduce, to the extent possible, the distance between the orifice taps in the flowline and the laterally outwardmost portions of the manifold/pressure sensor unit package.

SUMMARY OF THE INVENTION

It is therefore an object of the present invention to provide a manifold on which can be mounted multiple pressure sensor units so as to form a compact manifold/pressure sensor unit package.

Another object of the present invention is to provide a valve manifold formed of a monolithic body that can support dual pressure sensor units on a single, planar instrument face formed on the body.

The above and other objects of the present invention will become apparent from the drawings, the description given herein, and the appended claims.

The instrument manifold of the present invention provides an interface between a flowline control manifold and first and second pressure sensor units, the flowline control manifold including a high pressure passageway and a low pressure passageway selectively controlled by respective high pressure and low pressure control valves. The instrument valve manifold of the present invention has a monolithic body that defines a mating surface for mating with the process control manifold and an instrument face for mating with the first and second pressure sensor units. The monolithic body further includes an opposed bottom face spaced from and generally parallel to the instrument face. A first, high pressure plenum and a low pressure plenum are formed in the instrument face for cooperation with the first pressure sensor unit while a second high pressure plenum is formed in the instrument face for cooperation with the second pressure sensor unit. The body has a peripheral wall having a first edge contiguous the instrument face and a second, axially spaced edge contiguous the bottom face. A first portion of the peripheral wall is disposed transverse to and on opposite sides of the instrument face and the bottom face with respect to the mating face, the first portion of the peripheral wall forming an equalizing valve pocket surface. Formed in the equalizing valve pocket surface is a low pressure equalizing valve pocket and a high pressure equalizing valve pocket. A high pressure fluid passageway extends from the mating surface to the high pressure equalizing valve pocket while a low pressure fluid passageway extends from the mating surface to the low pressure equalizing valve pocket. The high pressure fluid passageway is in open communication with the high pressure plenum while the low pressure fluid passageway is in open communication with the low pressure plenum. An equalizing fluid passageway interconnects the high pressure equalizing valve pocket and the low pressure equalizing valve pocket, and an equalizing valve disposed in at least one of the high and low pressure equalizing valve pockets selectively controls flow through the equalizing fluid passageway. A gauge pressure passageway is connected to the high pressure fluid passageway and is in open communication with the second high pressure plenum, the gauge pressure passageway terminating in a port opening through a second portion of the peripheral wall. A block valve pocket intersects the gauge pressure passageway between the first and second high pressure plenums and carries a block valve to selectively control flow through the gauge pressure passageway.

BRIEF DESCRIPTION OF THE DRAWINGS

FIG. 3 is a top, plan view of the instrument valve manifold of the present invention.

FIG. 4 is an elevational, cross-sectional view taken along the lines 4—4 of FIG. 3.

FIG. 5 is a cross-sectional view taken along the lines 5—5 of FIG. 4.

FIG. 6 is a cross-sectional view taken along the lines 6—6 of FIG. 5.

DESCRIPTION OF THE PREFERRED EMBODIMENTS

As used herein, the term "pressure sensor unit" includes an instrument that simply measures pressure or other parameters, e.g., temperature, as well as an instrument that measures and transmits the pressure readings to a remote location.

Figure 1:
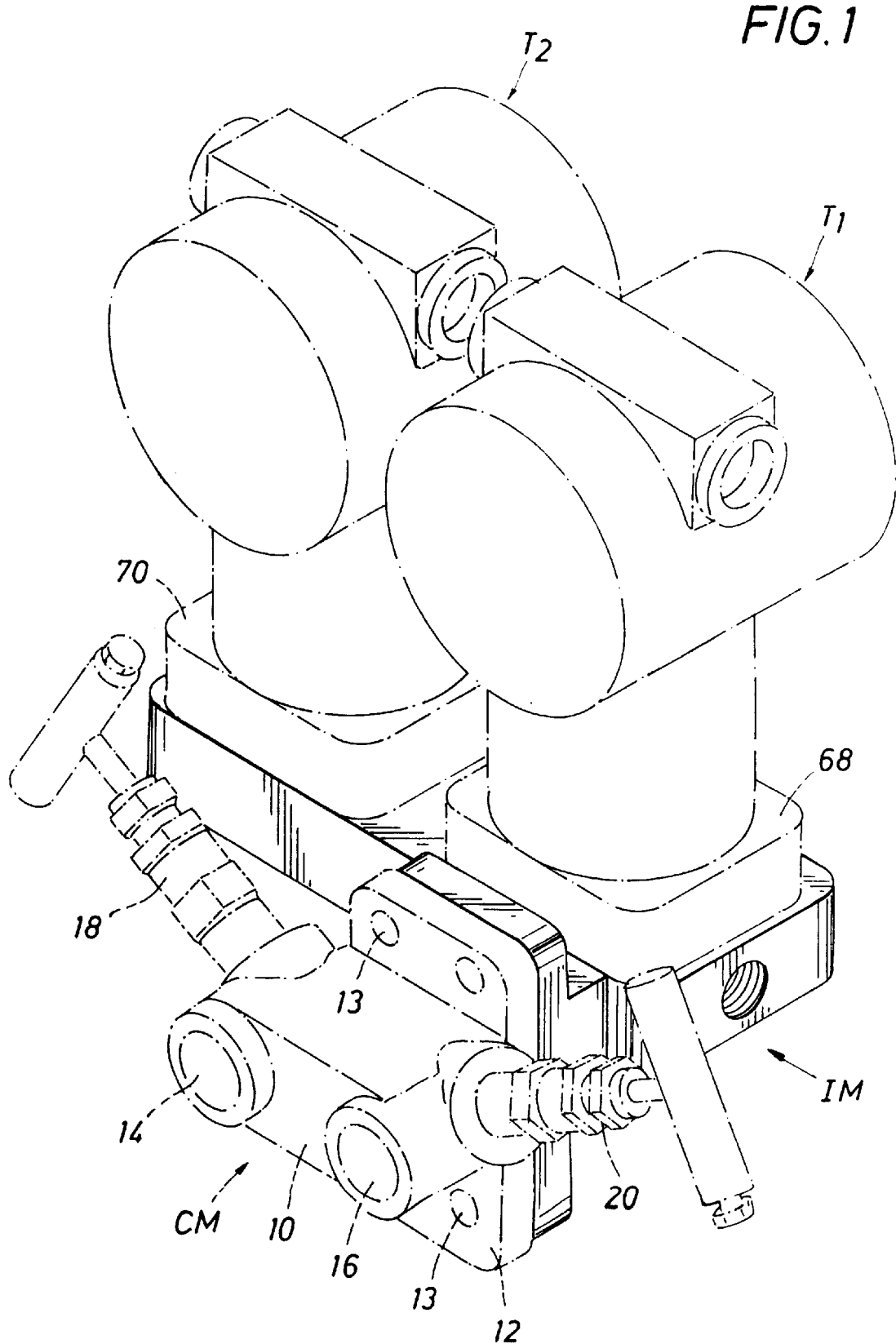
FIG. 1 is a perspective view of an instrument valve manifold in accordance with the present invention connected to a flowline control manifold and a pair of pressure sensor units.
Figure 2:
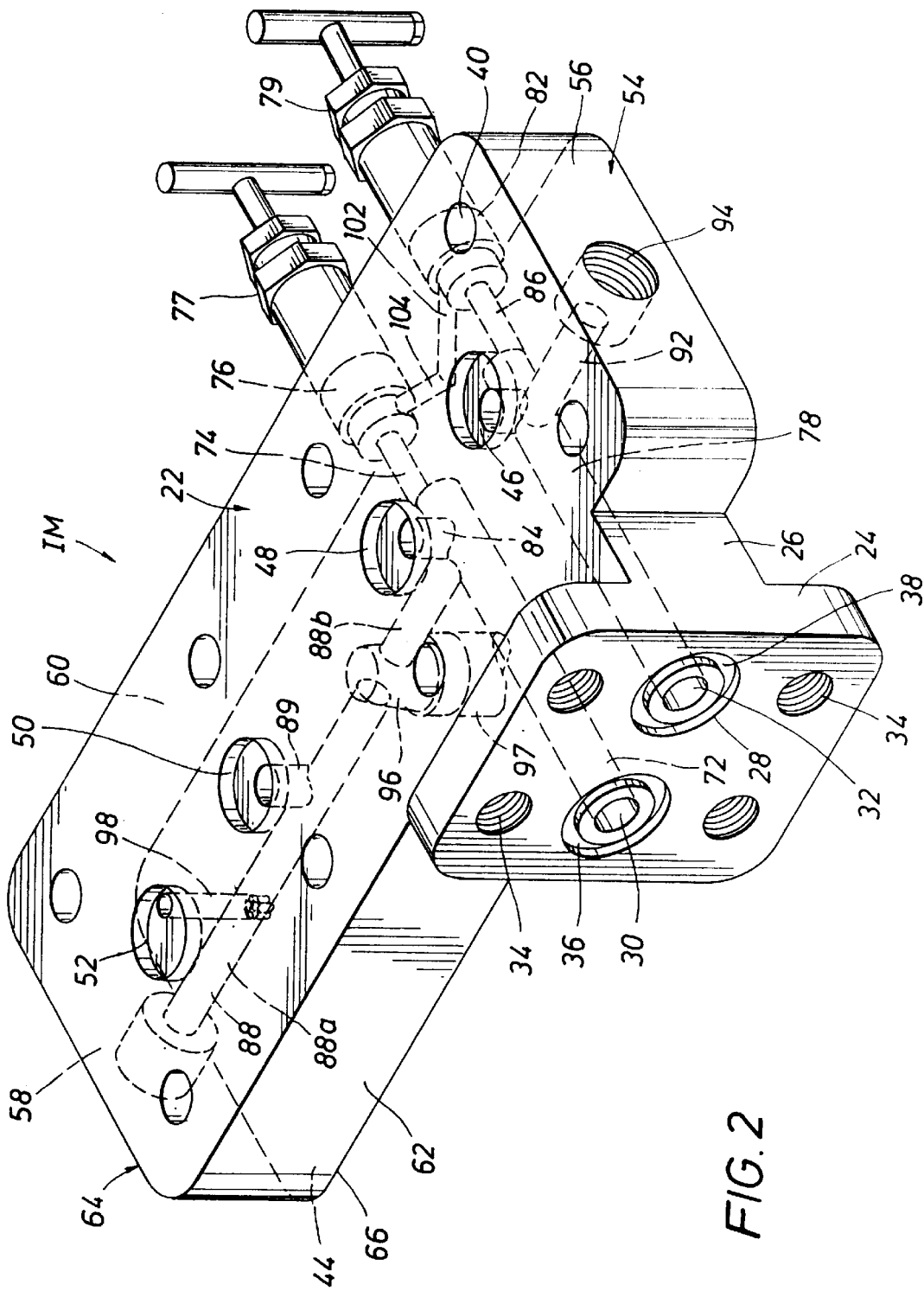
FIG. 2 is an isometric view of the instrument valve manifold of the present invention showing the internal passageway system.

With reference first to FIG. 1, there is shown a complete manifold/pressure sensor package that can be used to measure the differential pressure and hence determine fluid flow through a main flowline, as well as determine absolute or gauge pressure in the flowline. As can be seen, because each major component of the package has a substantially planar mating surface that mates to a corresponding planar mating surface of another major component, there are no major components of the package of any significant weight that are spaced from one another and secured to any member that can realistically be characterized as a lever arm. Accordingly, bending moments or torsional forces on the components of the package, as well as on the package itself, are substantially reduced. With reference then to FIG. 1, there is shown a flowline control manifold indicated generally as CM, an instrument manifold indicated generally as IM, a differential pressure sensor unit indicated generally as $T_1$, and a gauge pressure sensor unit indicated generally as $T_2$. Control manifold CM is fully described in co-pending application Ser. No. 08/941,951, filed Oct. 1, 1997, and incorporated herein by reference for all purposes. Basically, control manifold CM is monolithic in nature, being machined, cast, welded, or otherwise formed from a suitable material, e.g., stainless steel. Manifold CM has a body 10 and a mating flange 12 provided with spaced bolt holes 13, flange 12 having a planar mating face (not shown). Manifold CM also has a high pressure process fluid inlet 14 and a low pressure process fluid inlet 16. It will be appreciated that, while not shown, corresponding high and low pressure fluid outlets are provided in the mating face of flange 12. Control of high pressure fluid entering manifold CM through high pressure inlet 14 is accomplished by means of high pressure control (block) valve 18 while control of low pressure fluid entering manifold CM through low pressure inlet 16 is controlled by low pressure control (block) valve 20.

Instrument manifold IM has a monolithic body, shown generally as 22 and includes a mating flange 24 interconnected to body 22 by a neck portion 26. Flange 24, neck 26, and body 22 are generally monolithically formed of a suitable material, such as stainless steel. Mating flange 24 has a generally planar mating surface 28 having a high pressure fluid inlet 30 and a low pressure fluid inlet 32. Mating flange 24 is also provided with a series of threaded bores 34 that are in register with bolt holes 13 in mating flange 12 on control module CM such that when the mating surface (not shown) of flange 12 is matingly engaged with the mating surface 28, such that suitable bolts (not shown) can be used to tightly and rigidly secure control module CM to instrument module IM. Sealing around inlets 30 and 32 and the corresponding outlets in flange 12 of control module CM is accomplished by means of seal rings (not shown) that are received in grooves 36 and 38, which are in surrounding relationship to inlets 30 and 32, respectively. In this regard, it will be understood that the mating surface of flange 12 is provided with like grooves that are in register with grooves 36 and 38, seal rings being received in the registering grooves when flanges 12 and 24 are secured together, thereby forming fluid-tight seals.

Body 22 of instrument manifold IM has an instrument face 42 and a bottom face, shown in phantom as 44, faces 42 and 44, in the embodiment shown, being generally planar and parallel to one another. Throughbores 40 extend through body 22 from face 42 to face 44. Formed in instrument face 42 is a low pressure plenum 46 and a first high pressure plenum 48, a second high pressure plenum 50, and a vent plenum 52. Body 22 is further defined by a peripheral wall, shown generally as 54, which, in the embodiment shown, has a first end surface 56, a second end surface 58 (shown in phantom), a back surface 60 (shown in phantom), and a front surface 62. Peripheral wall 54 has a first peripheral edge 64 that is contiguous with instrument face 42 and a second, spaced peripheral edge 66 that is contiguous with bottom face 44. It will thus be seen that body 22 is generally rectangular, of wafer-type construction with neck 26 and mating flange 24 projecting from front wall surface 62.

With reference again to FIG. 1, it can be seen that pressure sensor unit $T_1$ is mounted on instrument face 42 of instrument manifold IM such that high pressure and low pressure plenums 48 and 46 cooperate with suitable pressure transducers, e.g., diaphragms, positioned in a flange 68 of the housing of pressure sensor unit $T_1$. Flange 68 forms a planar mating surface that mates to instrument face 42 such that the diaphragms are in register with plenums 48 and 46 in the well known manner. Differential pressure transmitters of the type under consideration, e.g., $T_1$, are well known and exemplified by Rosemount Model 3051 C differential pressure transmitter, marketed by Rosemount, Inc., Eden Prairie, Minn. Pressure sensor unit $T_1$ is secured to instrument face 42 by means of bolts (not shown) that are received through bores 40 and engage threaded, registering bores (not shown) in flange 68 of pressure sensor unit $T_1$.

Gauge pressure sensor unit $T_2$ is provided with a flange 70 forming a generally planar mating surface that mates to instrument face 42 and, as pressure sensor unit $T_1$, is secured to instrument module IM by means of bolts extending through bores 40, which engage threaded bores (not shown) in flange 70. Gauge pressure sensor unit T2 is provided with a suitable pressure transducer disposed in flange 70 and that is in register with second high pressure plenum 50 when pressure sensor unit 72 is secured to instrument manifold IM as described above.

With reference now to FIGS. 2–6, it can be seen that high pressure fluid from control manifold CM enters inlet 30 and passes through high pressure passageway 72, high pressure passageway 72 being generally aligned and in fluid communication with a high pressure link passageway 74, which opens into a high pressure equalizing valve pocket 76 in which is received a high pressure equalizing valve 77. Likewise, low pressure fluid passes through inlet 30 and low pressure fluid passageway 78 into low pressure link passageway 80, which opens into low pressure valve pocket 82. Basically, it can be seen that while link passageways 74 and 80 are of reduced diameter relative to passageways 72 and 78, respectively, there is nonetheless formed an essentially straight fluid passageway from the inlet 30 to the valve pocket 76 or, alternately, from the inlet 32 to the valve pocket 82 in which is received a low pressure equalizing valve 79. As shown, passageways 72 and 74, on the one hand, and 70 and 80, on the other hand, form generally parallel, straight, uninterrupted flowpaths between face 28 of flange 24 and the portions of wall 60 in which are formed valve pockets 76 and 82. As can also be seen, the flowpaths are essentially normal to surface 28 and wall portion 60.

High pressure passageway 72 is in open communication with first high pressure plenum 48 via stub passageway 84, which opens into high pressure plenum 48. Likewise, low pressure plenum 46 is in open communication with low pressure passageway 78 via stub passageway 86, which provides flow communication between low pressure plenum 46 and low pressure passageway 78.

A gauge pressure passageway 88 having a first run 88a and a second run 88b extends generally longitudinally of body 22 and is in open communication with high pressure passageway 72 via a stub passageway 89, run 88a of gauge pressure passageway 88 terminating in a threaded vent port 90 that opens through end surface 58. In a similar fashion, a vent passageway 92 in open communication with low pressure passageway 78 opens into a threaded vent port 94 formed in opposite end surface 56.

It can be seen that passageways 72, 74, 78, 08, 88, and 92 are coplanar, and indeed passageways 72, 78, 88, and 92 are formed such that they can all be bisected by a single plane. Also, gauge pressure passageway 88 and vent passageway 92 are coaxial and generally normal (perpendicular) to passageways 72 and 78. This arrangement of the passageways contributes to the compactness of the manifold IM.

Formed in the bottom face 44 of body 22 is a valve pocket 96, valve pocket 96 intersecting gauge pressure passageway 88, a block valve 97 being received in valve pocket 96 serving to control flow through gauge pressure passageway 88. Opening into plenum 52 is a vent bore 98 that extends partially through body 22, vent bore 98 being in open communication with a plurality of smaller diameter vent holes 100 that open through bottom face 44.

An equalizing passageway having a first angled run 102 and a second, intersecting angled run 104 provides fluid communication between plenums 46 and 48 when both of equalizing valves 77 and 79 are open.

In operation, it will be appreciated that with control valves 18 and 20 open and gauge passageway block valve 97 closed, high pressure fluid will enter plenum 48 via passageways 72 and 84 while low pressure fluid will enter plenum 46 via low pressure passageways 78 and 86, it being appreciated that the high pressure equalizing valve 77 and low pressure equalizing valve 79 are both closed. This will permit measurement of the differential pressure by means of pressure sensor unit $T_1$. If it is desired to equalize, high pressure equalizing valve 77 and low pressure equalizing valve 79 are open. It will be appreciated that only one of high pressure equalizing valve 77 or low pressure equalizing valve 79 is required and that accordingly one of valve pockets 76 and 82 could be plugged, although in most cases, for redundancy and in the event one of the equalizing valves is leaking, it is preferred that two such equalizing valves be used.

If it is desired to measure the static pressure in the main flowline, using pressure sensor $T_2$, at least one of high pressure equalizing valve 77 and 79 is closed, and block valve 97 (shown partially in phantom) is open such that high pressure fluid would be in communication with plenum 50 and hence the pressure transducer in pressure sensor unit $T_2$. Pressure sensor unit $T_2$ can be vented via plenum 52, passageway 98, and ports 100. Bores 90 and 94 will be normally closed using vent nipples well known to those skilled in the art but can be used to access the interior passageways of the manifold IM, to accomplish calibration of the pressure sensor units., venting of the system, etc.

It can be seen that the instrument manifold of the present invention provides an extremely compact unit on which can be mounted dual pressure sensor units. Further, this compactness is accomplished with a minimum of complex machining functions, such as angled drilling. In the latter regard it is to be noted that except for passageways 102 and 104, all other passageways, valve pockets, vent ports, plenums, bolt holes, etc., can be formed by drilling or other machining operations normal (perpendicular) to the surfaces in which they are formed.

It will be apparent that the present invention provides a manifold/pressure sensor package of greatly reduced mass that was not heretofore available. This reduced mass results in reduced loading on the connections between the flowline and the package. In this regard and as well known to those skilled in the art, the connections, e.g., the orifice taps, to the flowline are typically stabilized, e.g., with futbols, in an attempt to provide a more rigid interface or foundation between the flowline and the manifold/pressure sensor unit package. Since the package of the present invention, compared with prior art packages, has less mass and essentially no lever arm, the components used to effect stabilization need not be as bulky or complex as prior art components used for that purpose, again simplifying installation and reducing cost.

It will be appreciated by those skilled in the art that various types of valves and vent nipples can be used in the manifold of the present invention, all of which are of conventional construction and need not be described in detail here. For example, valves such as ball valves, plug valves, and globe valves may be used as the various valves. Additionally, the valves employed may be of the so-called soft seat or seated metal type, depending upon the environment to which the manifold of the present invention is subjected.

The foregoing description and examples illustrate selected embodiments of the present invention. In light thereof, variations and modifications will be suggested to one skilled in the art, all of which are in the spirit and purview of this invention.

What is claimed is:

1. An instrument valve manifold for interfacing between a flowline control manifold and first and second pressure sensor units, said flowline control manifold including a high pressure passageway and a low pressure passageway selectively controlled by respective high pressure and low pressure control valves, comprising:

a monolithic body, said body defining a mating surface for mating with said process control manifold, a high pressure fluid inlet and a low pressure fluid inlet being formed in said mating surface, an instrument face for mating with said first and second pressure sensor units, an opposed bottom face spaced from said instrument face, a first high pressure plenum and a low pressure plenum being formed in said instrument face for cooperation with said first pressure sensor unit, a second high pressure plenum being formed in said instrument face for cooperation with said second pressure sensor unit, said body further including a peripheral wall having a first edge contiguous said instrument face and a second edge contiguous said bottom face, a first surface of said peripheral wall being disposed transverse to and on opposite sides of said instrument face and said bottom face with respect to said mating face, said first portion of said peripheral wall forming an equalizing valve pocket surface;

a low pressure equalizing valve pocket and a high pressure equalizing valve pocket formed in said equalizing valve pocket surface;

a high pressure fluid passageway extending from said high pressure inlet in said mating surface to said high pressure equalizing valve pocket, a low pressure fluid passageway extending from low pressure inlet in said mating surface to said low pressure equalizing valve pocket, said high pressure fluid passageway being in open communication with said high pressure plenum, said low pressure fluid passageway being in open communication with said low pressure plenum;

an equalizing fluid passageway interconnecting said high pressure equalizing valve pocket and said low pressure equalizing valve pocket;

an equalizing valve disposed in at least one of said high and low pressure equalizing valve pockets to selectively control flow through said equalizing fluid passageway;

a gauge pressure passageway connected to said high pressure fluid passageway, said gauge pressure passageway being in open communication with said second high pressure plenum;

a block valve pocket intersecting said gauge pressure passageway between said first and second high pressure plenums; and a block valve disposed in said block valve pocket to selectively control flow through said gauge pressure passageway.

2. The manifold of claim 1 wherein said mating surface on said body is formed by a flange projecting from a third surface of said peripheral wall opposite said first surface of said peripheral wall.

3. The manifold of claim 1 wherein straight flow paths are formed between said high pressure inlet and said high pressure equalizing valve pocket, and said low pressure inlet and said low pressure equalizing valve pocket, respectively.

4. The manifold of claim 3 wherein said high pressure flow path and said low pressure flow path are parallel.

5. The manifold of claim 1 wherein said gauge pressure passageway is substantially perpendicular to said high pressure fluid passageway.

6. The manifold of claim 5 including a vent passageway in communication with said low pressure passageway, said vent passageway being coaxial with said gauge pressure passageway.

7. The manifold of claim 6 wherein said high pressure passageway, said low pressure passageway, said gauge pressure passageway, and said vent passageway are coplanar.

8. The manifold of claim 7 wherein said high pressure passageway, said low pressure passageway, said gauge passageway, and said vent passageway are bisected by a single plane.

9. The manifold of claim 1, further including an instrument vent for venting said second pressure unit.

10. The manifold of claim 9 wherein said instrument vent comprises a plenum formed in said instrument face and a passageway extending from said plenum and opening through said bottom face.

11. The manifold of claim 1 wherein equalizing valves are disposed in both of said high and low pressure equalizing valve pockets.

12. The manifold of claim 1 wherein said block valve pocket is formed in said bottom face of said body.

13. The manifold of claim 1 wherein said instrument face and said bottom face are parallel.

14. The manifold of claim 1 wherein a vent port is formed in said second surface of said peripheral wall in open communication with said gauge pressure passageway.

15. The manifold of claim 1 wherein said high pressure fluid passageway, said low pressure fluid passageway, said gauge pressure passageway, and said vent passageway are all normal to respective planar outer surfaces of said manifold body through which said passageways are formed.

* * * * *